May 7, 1963 R. A. DANIS 3,088,416
CENTRIFUGAL PUMP
Filed July 21, 1961
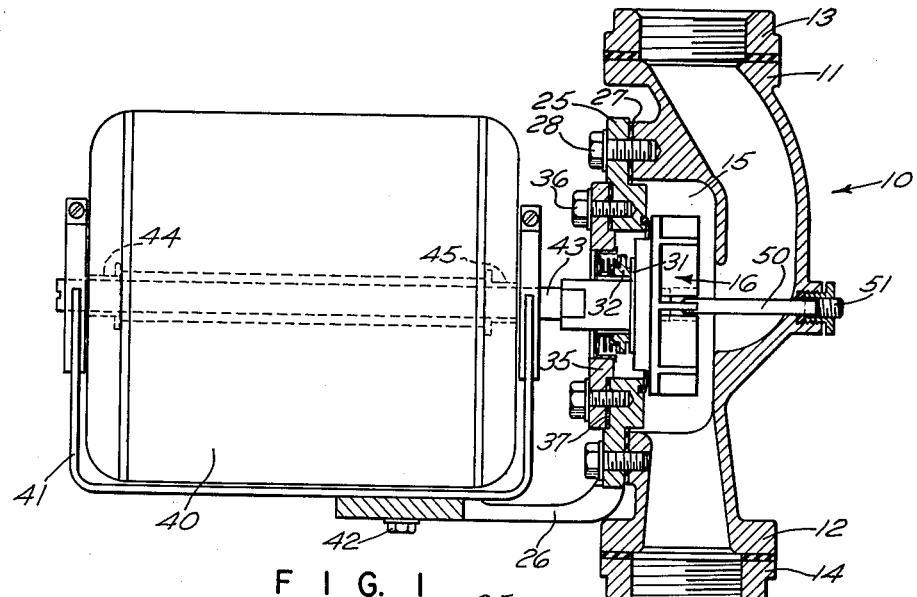
FIG. 1
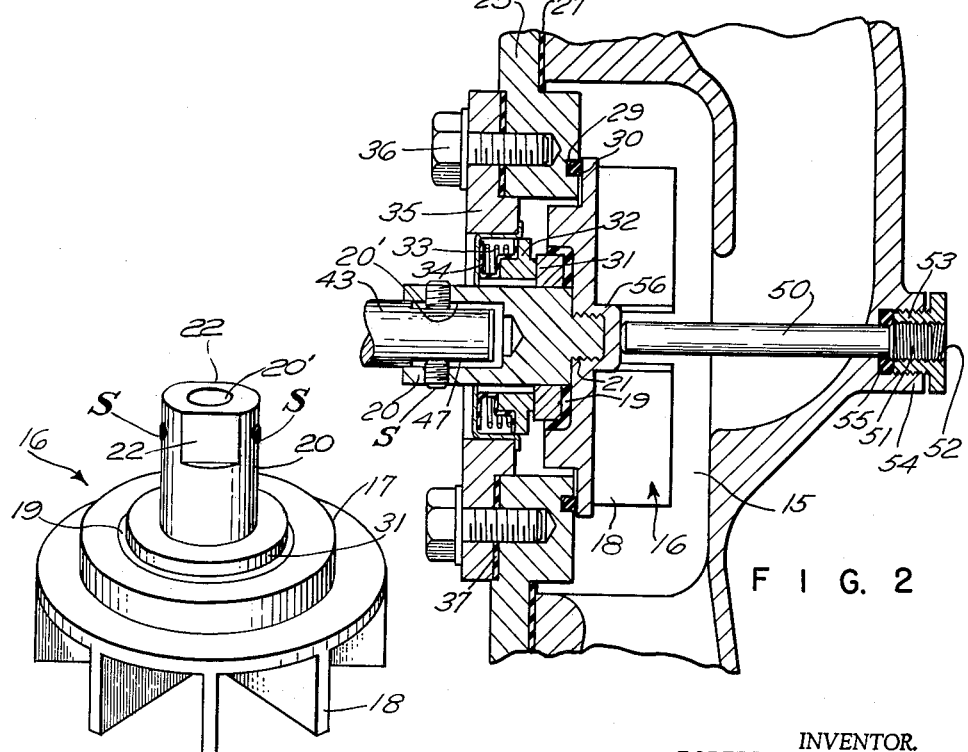
FIG. 2
FIG. 3
INVENTOR.
ROBERT A. DANIS
BY
*Barlow & Barlow*
ATTORNEYS

United States Patent Office 3,088,416
Patented May 7, 1963

3,088,416
CENTRIFUGAL PUMP
Robert A. Danis, West Warwick, R.I., assignor to General
Fittings Company, a corporation of Rhode Island
Filed July 21, 1961, Ser. No. 125,746
4 Claims. (Cl. 103—103)

This invention relates to pump structures.

In servicing pump structures which reman on the line, it is generally necessary to shut off or in some way isolate the pump from the liquid line to replace such items as shaft seals. If this is not done, leakage will occur during the repair procedure. It can be seen, therefore, that it is very desirable to have a means whereby the pump can be left on the line and repair effected without necessitating the installation of expensive valves.

Therefore, a principal object of this invention is to provide a pump structure which lends itself to ease of servicing in the field without the necessity for draining the service pipe or otherwise disturbing the liquid line during this procedure.

Another object of the invention is to provide a pump structure which may be serviced with simple tools and needs nothing more than a screwdriver and/or an open-ended wrench to facilitate repair thereof.

Another object of this invention is to provide a positive means for sealing the pump in a line of a circulating system by actuation of the pump impeller in order that repairs on the pump may be effected.

With these and other objects in view, the invention consists of certain novel features of construction as will be more fully described and particularly pointed out in the appended claims.

In the accompanying drawings:

FIGURE 1 is a side elevational view of a close coupled centrifugal pump partly in section showing my invention;

FIGURE 2 is a fragmental sectional view showing a part of the pump illustrated in FIGURE 1 and showing the impeller in sealing position; and FIGURE 3 is a perspective view of the impeller used in the pump.

In proceeding with this invention, I provide a seal between the impeller and the housing by inserting an O-ring in the housing against which the impeller may be moved by some positive means to provide a seal for the system during the repairs on the normal sealing means for the pump. After seal is effected by movement of the impeller, removal of parts may be had to provide access to the primary sealing means about the drive shaft.

Referring now to the drawings, 10 designates a pump housing having flange inlets 11 and flange outlets 12 which are adapted to receive threaded flange couplings 13 and 14. Centrally of the body 10 there is provided a circular cavity 15 in which is located an impeller 16. This impeller which is shown more particularly in FIGURE 3 is generally cylindrical and is provided on one face thereof with a flat surface 17 and on the other face thereof with a plurality of vanes 18. Centrally of the impeller there is formed a threaded bore into which is received a hub 20 in threaded engagement as at 21. The hub 20 is provided with a central bore 20' into which extends a set screw S. The hub 20 is flattened on its exterior surface as at 22 for a purpose to be presently described. An apertured plate 25 is positioned over the cavity 15, which plate has an L-shaped flange part at 26 extending therefrom to provide a support for the driving motor. The plate 25 is positioned on the housing 10 with a gasket 27 therebetween and is secured by a number of bolts 28. The inner face of the plate 25 is provided with an annular groove 29 which receives an O-ring or other resilient sealing means 30 for a purpose which will hereinafter appear.

To provide shaft sealing as the rotative shaft emerges from the pump housing, a mechanical seal is utilized. This seal comprises a rotative part 31 that is received on the impeller 16 and which may preferably consist of a piece of hard material, such as stainless steel, which is provided with a flat surface face. A stationary part 32, which may be graphite, is urged against the flat face of the rotative part 31 by a suitable spring means 33 which also positions the impeller in working position. The other end of the spring 33 abuts an annular plate 34 which is received within an aperture of a face plate 35 that is bolted to the plate 25 by a number of bolts 36 with gasket 37 between. The plate 35 which serves as a cover plate for the cavity 15 also carries the primary seal.

Received on the mounting bracket 26 is an electrical motor 40. The electrical motor 40 has a U-shaped mounting bracket 41 which is suitably bolted to the bracket 26 as at 42 through slots therein extending axially of its shaft for adjustment of the position of the impeller and the tension on spring 33 and has a central rotative shaft 43 in bearings 44, 45. One end of the shaft 43 is flattened along its termination 47 which is received within the cylindrical bore 20' of the hub 20 and secured therein by set screws S. The various features of the pump construction which has been described above will now become apparent by discussing the method of removal of the motor and/or the motor and seal.

A shutoff pin 50 is threaded at 51 near its outer end and has threaded engagement with the bore 52 in the gland nut 53. Nut 53 is received in the boss 54 of the housing, and suitable packing may be provided as at 55 to prevent leakage. By means of the threads 51 and 52, the pin 50 may be rotated to cause it to move axially into engagement with the boss 56 on the body of the impeller 16, and pin 50 will force the impeller, when the screws which hold the motor are loosened, against the O-ring 30 so as to provide a seal between the housing and the impeller.

If we assume that the seal between the primary sealing parts 31 and 32 has become sufficiently worn so that leakage is apparent, the first step in effecting removal of the seal is to loosen the motor mounting bolts 42, and when this is loosened, the motor may be moved slightly to the left as shown in FIGURE 1 until the surface 17 of the impeller engages the O-ring 30 after which the shutoff screw 50 may be brought up against the boss 56 on the impeller to force it against the O-ring 30 to provide a seal between the impeller and the casing. Next the set screws S are loosened and the motor 40 is grasped and pulled away from the impeller. Should the motor shaft stick, a wrench may engage the surfaces 22 to provide rotational movement between the parts. The motor is then completely removed from the bracket 26. The cap screws 36 are then removed from the seal plate 35, and this seal plate together with the spring 33 and portion 32 of the seal are removed from the impeller. Access is thus afforded to the seal 31 of the impeller which may then be removed and replaced by a new one. Also the removal of seat plate 35 provides access to the stationary part of the seal 32 which may be replaced. With these two parts of the seal replaced, the assembly may then be effected by positioning the seal plate with the seal 32 into position screwing in the cap screws 36 and reinstalling the motor, first forcing the shaft 43 into the bore 20' of the hub by sliding the motor along the bracket 26 and fastening set screws S. The motor may now be adjusted along the bracket 26 until about 10 pounds pressure is provided on the seal spring 33 and then the motor may be clamped in place by the screws 42. By providing about 10 pounds pressure on the spring 33, the impeller will be moved from its sealing position against the O-ring 30 upon release of the pin 50 and into the position substantially shown in FIGURE 1 where it may further actuate the liquid to be pumped.

I claim:

1. In a pump having a housing having a removable face plate, a pumping means located within said housing, actuating means leading into said housing through said face plate and coupled to said pumping means, a first sealing means including a spring, said sealing means acting between said actuating means and said face plate and carried by the face plate, secondary sealing means comprising a disk with a sealing face on the pumping means and a cooperating sealing face on the housing spaced from the face plate and both circumscribing the actuating means, said spring normally maintaining the faces of the secondary sealing means spaced and thus ineffective and rigid means to positively move said sealing faces together against the action of the spring to effect a seal between the housing and the pumping means whereby the face plate and first sealing means may be removed for replacement while maintaining fluid in the housing.

2. In a pump as in claim 1 wherein the means moving the faces together is a rod extending axially of the actuating means through said housing to be accessible from the outside thereof.

3. In a pump as in claim 2 wherein said rod is threaded for axial movement by rotation thereof in said housing.

4. In a pump having a housing, a pumping means located within said housing, actuating means leading into said housing and coupled to said pumping means, said pumping means comprising a rotary impeller means and a hub extending from said rotary impeller means through said housing, a shaft, said shaft and said hub being removably coupled together by a set screw, a first sealing means between said actuating means and said housing, secondary sealing means comprising a portion of the pumping means and the housing circumscribing the actuating means, resilient means normally maintaining the secondary sealing means ineffective and means engaging said hub to positively axially move the pumping means toward said housing against the action of the resilient means to effect a seal between the housing and the pumping means and holding the hub and impeller against movement.

References Cited in the file of this patent

UNITED STATES PATENTS

| | | |
|---|---|---|
| 860,668 | Jaeger | July 23, 1907 |
| 890,662 | Lager | June 16, 1908 |
| 1,667,992 | Sherwood et al. | May 1, 1928 |
| 2,255,287 | Jacobsen | Sept. 9, 1941 |
| 2,291,346 | Robinson | July 28, 1942 |
| 2,433,589 | Adams | Dec. 30, 1943 |
| 2,836,124 | Lung | May 27, 1958 |

FOREIGN PATENTS

| | | |
|---|---|---|
| 141,199 | Sweden | July 14, 1953 |
| 375,937 | Great Britain | July 7, 1932 |
| 1,237,156 | France | June 20, 1960 |